(12) United States Patent
Mahoney et al.

(10) Patent No.: US 7,735,904 B2
(45) Date of Patent: Jun. 15, 2010

(54) VEHICLE SLEEPER BUNK PIVOTABLE BETWEEN STORED AND DEPLOYED POSITIONS VIA EXTENDED-RETRACTED-EXTENDED FLOWABLE-MEDIUM SPRING AND METHOD

(75) Inventors: William Mahoney, Sunset, SC (US); Richard Langhoff, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 12/086,816

(22) PCT Filed: Dec. 27, 2005

(86) PCT No.: PCT/US2005/046918

§ 371 (c)(1),
(2), (4) Date: Jun. 19, 2008

(87) PCT Pub. No.: WO2007/075159

PCT Pub. Date: Jul. 5, 2007

(65) Prior Publication Data

US 2009/0001760 A1    Jan. 1, 2009

(51) Int. Cl.
*B60N 2/34* (2006.01)
*B61D 1/08* (2006.01)
*B63B 29/10* (2006.01)

(52) U.S. Cl. .................. 296/190.02; 105/321; 114/193

(58) Field of Classification Search ............... 5/118, 5/9.1, 8, 943, 430, 136, 137, 138, 2.1; 296/170, 296/174, 190.02; 105/316, 321, 314, 317, 105/319; 114/192, 193; 244/118.6
See application file for complete search history.

(56) References Cited

U.S. PATENT DOCUMENTS

| | | | | |
|---|---|---|---|---|
| 562,242 | A | * | 6/1896 | Reese et al. ............ 105/316 |
| 657,727 | A | * | 9/1900 | Brown ...................... 105/317 |
| 1,739,321 | A | * | 12/1929 | Middendorf ............ 105/316 |

(Continued)

FOREIGN PATENT DOCUMENTS

EP    0 278 547 A2    8/1988

*Primary Examiner*—Gay Ann Spahn
(74) *Attorney, Agent, or Firm*—Martin Farrell; Michael Pruden

(57) ABSTRACT

A system for supporting individuals or objects is disclosed that can be used, e.g., as a bunk for sleeping upon within a vehicle, such as, e.g., a truck or commercial vehicle. The system preferably includes a support platform, a pivot mechanism, and at least one flowable-medium spring. The support platform is provided with an upper surface to support at least one individual or object within a vehicle. The pivot mechanism is connected to the support platform so as to pivot the support platform around a pivot axis to move between a stored position and a deployed position in which the support platform supports the at least one individual or object. The at least one flowable-medium spring is provided with a first end fixed relative to the vehicle and a second end fixed relative to the support platform at a location displaced from the pivot axis. Each of the at least one flowable-medium springs is arranged so as to impart an extension force that biases the support platform toward the deployed position and so as to impart an extension force that biases the support platform toward the stored position during at least portions of the movement of the support platform between the stored position and the deployed position.

20 Claims, 7 Drawing Sheets

U.S. PATENT DOCUMENTS

| | | | | |
|---|---|---|---|---|
| 1,846,824 A * | 2/1932 | White | | 105/321 |
| 1,945,875 A * | 2/1934 | Woller | | 5/10.2 |
| 2,004,898 A * | 6/1935 | Marchant | | 105/321 |
| 2,358,546 A * | 9/1944 | Tully et al. | | 5/10.2 |
| 2,492,362 A * | 12/1949 | Hopeman, Jr. et al. | | 5/9.1 |
| 2,504,769 A * | 4/1950 | Watter | | 105/315 |
| 2,560,513 A * | 7/1951 | Lyon | | 5/9.1 |
| 2,592,924 A * | 4/1952 | Lyon | | 105/318 |
| 2,632,667 A * | 3/1953 | Gray | | 296/172 |
| 2,657,400 A | 11/1953 | Pagon | | |
| 2,676,333 A * | 4/1954 | Patton et al. | | 5/9.1 |
| 2,844,109 A * | 7/1958 | Austgen et al. | | 105/321 |
| 3,402,960 A | 9/1968 | Erke | | |
| 3,811,138 A * | 5/1974 | Del Missier | | 5/9.1 |
| 4,005,898 A * | 2/1977 | Way | | 296/174 |
| 4,084,276 A * | 4/1978 | Trexler, Jr. et al. | | 5/118 |
| 4,107,797 A * | 8/1978 | Maxwell, Sr. | | 5/118 |
| 4,141,093 A | 2/1979 | Marsden | | |
| 4,215,899 A * | 8/1980 | Schmidt et al. | | 296/190.02 |
| 4,462,127 A * | 7/1984 | Schmidt et al. | | 5/118 |
| 4,664,438 A | 5/1987 | Crepaldi | | |
| 4,826,235 A * | 5/1989 | Zwick | | 296/170 |
| 4,918,772 A * | 4/1990 | Haile | | 5/119 |
| 4,926,783 A * | 5/1990 | Lathers | | 114/363 |
| 5,033,134 A * | 7/1991 | Burchett | | 5/133 |
| 5,081,724 A * | 1/1992 | Takahashi et al. | | 5/136 |
| 5,638,559 A | 6/1997 | Natri | | |
| 5,638,560 A * | 6/1997 | Rigdon et al. | | 5/118 |
| 5,864,905 A * | 2/1999 | Helmsderfer | | 5/655 |
| 5,868,460 A * | 2/1999 | Christensen | | 297/62 |
| 5,875,502 A * | 3/1999 | Kolbenstetter et al. | | 5/136 |
| 5,876,059 A * | 3/1999 | Kleinberg | | 280/730.1 |
| 5,978,988 A * | 11/1999 | Burchett | | 5/136 |
| 5,984,404 A | 11/1999 | Novoa | | |
| 6,055,688 A * | 5/2000 | Helmsderfer et al. | | 5/655 |
| 6,163,900 A * | 12/2000 | Stevenson | | 5/118 |
| 6,175,975 B1 * | 1/2001 | Bottcher et al. | | 5/136 |
| 6,231,114 B1 | 5/2001 | Warmoth | | |
| 6,401,276 B1 * | 6/2002 | Sherman | | 5/136 |
| 6,405,391 B1 * | 6/2002 | Hakansson | | 5/118 |
| 6,612,606 B1 * | 9/2003 | Bergenheim et al. | | 280/728.1 |
| 6,629,322 B1 * | 10/2003 | Monroe | | 5/10.2 |
| 6,644,724 B1 * | 11/2003 | Penaloza et al. | | 296/190.02 |
| 6,735,797 B1 * | 5/2004 | Long et al. | | 5/118 |
| 7,051,384 B1 * | 5/2006 | Guillot et al. | | 5/9.1 |
| 2003/0041377 A1 * | 3/2003 | Bailey | | 5/118 |
| 2003/0192120 A1 * | 10/2003 | Bailey | | 5/118 |
| 2004/0158920 A1 * | 8/2004 | Walling | | 5/2.1 |

* cited by examiner

VEHICLE SLEEPER BUNK PIVOTABLE BETWEEN STORED AND DEPLOYED POSITIONS VIA EXTENDED-RETRACTED-EXTENDED FLOWABLE-MEDIUM SPRING AND METHOD

The present invention relates to vehicle parts and components, and the preferred embodiments relate, e.g., to systems and methods for mounting support members for passengers and/or other items, such as, e.g., sleeper bunks or berths within vehicles, especially within, e.g., trucks and/or commercial vehicles.

BACKGROUND

In various vehicles, especially in trucks and/or commercial vehicles, there is often a need to provide one or more sleeping area within the vehicle. By way of example, vehicles can often include one or more sleeper bunks or berths upon which one member of a driving team can rest while the other operates the vehicle, or which allows both members of the team to rest when parking the vehicle in a suitable rest area or stop.

While a variety of sleeper bunk or berth devices and systems are known, there is a continued need for improved devices and systems.

By way of example, the preferred embodiments of the present invention improve upon the technologies described in the following U.S. Patents, the disclosures of which are incorporated herein by reference in their entireties.

U.S. Pat. No. 6,231,114 to Warmoth discloses a bunk arrangement in which gas cylinders hold the bunk in the upper stowed position. However, among other things, the bunk rests on stops in the deployed position.

U.S. Pat. No. 5,984,404 to Novoa, et al. (Freightliner) discloses a bunk system (see FIGS. 1 *la* and 1 *lb* and column 7) having a bunk platform that stores in a recess in the ceiling and that is held in place by a gas cylinder. However, among other things, the bunk is positioned for use by pulling down the front end (contracting a gas cylinder) until the front end contacts a stop, and by then pulling down the rear end. The rear part of the bunk rides in a guide slot. The gas cylinder pivots during this movement to provide a small amount of pressure to hold the bunk in the deployed position.

U.S. Pat. No. 5,638,559 to Natri, et al. discloses, as described in the Abstract of the patent, a vehicle sleeping system or berth including "a ceiling formed with a downwards open recess" and "a berth holder and a bearing for mounting the berth holder for turning relative to the ceiling structure between a generally horizontal retracted position and a generally vertical lowered position." "A berth is journalled in the holder to be turnable when the holder is in its lowered position between an extended position, in which the berth extends substantially horizontally away from the holder, and a folded up position, in which the berth is disposed substantially vertically and is close to the holder." As shown in the figure, "[a] first gas spring is effective against the holder for exerting, over substantially the entire range of angular movement of the holder, a torque that tends to turn the holder in the direction from its lowered position toward its retracted position and increases as a function of the angle through which the holder turns in the direction from its lowered position toward its retracted position over substantially the entire range of angular movement of the holder" and a "second gas spring is effective between the holder and the berth and exerts a torque that tends to turn the berth in the direction from its extended position toward its folded up position a bunk arrangement having a platform hinged on a swing arm and foldable into a recess in the ceiling." As shown, the upper end of the swing arm has a protrusion 12 connected to a gas spring 10. The gas spring in an extended position holds the swing arm and bunk in the stored position. When the bunk is pulled down from the recess, the swing arm pivots, compressing the gas spring (which also pivots) until the gas spring and protrusion go past the center of rotation of the swing arm. The gas spring provides a very small force to maintain the swing arm in the deployed position.

U.S. Pat. No. 4,141,093 to Marsden discloses, as described in the Abstract, "[a] sleeping berth for a passenger car compartment includes a tubular bed frame and mattress combination which is hingedly movable between use and non-use positions to a side wall of the car" and in which "[t]he bed frame is latched in the non-use position and includes webbing which is spring loaded to urge the bed into the non-use position upon initial movement when raising the berth from a sleeping or use position." Among other things, the patent shows a pivoting bunk that is supported by spring tensioned straps.

U.S. Pat. No. 4,664,438 to Crepaldi discloses a pivoting berth or bunk arrangement for cabs of industrial vehicles or the like in which a strap supports the bunk in a lower position and can be reattached to support the bunk in an upper, stored position. As set forth in the Abstract, "[t]he bunk is so structured as to be easily deformed in case of a road accident by the thrust created by the rearward motion of the seats, when a device for automatic or manually-controlled rearward motion of the seats is activated, to contribute to the safety of the driver and the passenger."

As set forth below, the preferred embodiments of the present invention provide notable advancements over the above references and other existing systems and devices.

SUMMARY

The present invention overcomes various deficiencies and problems found in the above and/or other background art.

According to some examples, a system for supporting individuals or objects within a vehicle includes: a) a support platform having an upper surface to support at least one individual or object within a vehicle; b) a pivot mechanism connected to the support platform so as to pivot the support platform around a pivot axis to move between a stored position and a deployed position in which the support platform supports the at least one individual or object; c) at least one flowable-medium spring having a first end fixed relative to the vehicle and a second end fixed relative to the support platform at a location displaced from the pivot axis; d) each of the at least one flowable-medium spring being arranged so as to impart an extension force that biases the support platform toward the deployed position and so as to impart an extension force that biases the support platform toward the stored position during at least portions of the movement of the support platform between the stored position and the deployed position.

In some particular examples, the flowable medium includes a gas and/or a liquid. In some particular examples, the at least one flowable-medium spring is configured so as to provide varied damping along a stroke of the spring. In some particular examples, the flowable-medium spring is configured so as to provide increased damping proximate at least one end of the stroke of the spring. In some particular examples, the at least one flowable-medium spring supports the support platform in the deployed position, while in some other particular examples, the system includes at least one additional support (such as, e.g., at least one cable) that supports the support platform in the deployed position in a manner such that the flowable-medium spring mechanism does not bear a load imparted on the support platform. In some preferred examples, the flowable-medium spring includes an extension rod, a compression cylinder into which the extension rod extends, and a piston head attached to the extension rod within the cylinder. In some preferred examples, during movement of the support platform between the deployed and stored positions, a front side of the support platform opposite to the pivot axis follows a substantially arcuate path, and wherein the first end of the at least one spring mechanism is located at an opposite side of the arcuate path than the pivot axis. In some preferred examples, the first end of the at least one spring mechanism is fixed at or near a centerline of the support platform between the deployed and stored positions.

According to yet some other embodiments, a method for supporting individuals or objects within a vehicle includes: a) providing a support platform having an upper surface to support at least one individual or object within a vehicle; b) providing a pivot mechanism connected to the support platform so as to pivot the support platform around a pivot axis to move between a stored position and a deployed position in which the support platform supports the at least one individual or object; c) providing at least one flowable-medium spring having a first end fixed relative to the vehicle and a second end fixed relative to the support platform at a location displaced from the pivot axis; d) arranging each of the at least one flowable-medium spring so as to impart an extension force that biases the support platform into the deployed position and so as to impart an extension force that biases the support platform into the stored position during at least portions of the movement of the support platform between the stored position and the deployed position.

In accordance with some preferred embodiments of the invention, a bunk and/or other support surface for a moving vehicle includes one or more of the following advantageous features and/or benefits.

- A gas and/or hydraulic spring mechanism that provides support (i.e., biasing support) in both deployed (e.g., down) and stored (e.g., up) states or positions.
- A support system that does not require a conventional support bracket that may interfere with an occupant's use of the area below the bunk (e.g., for a lower bunk, a table underneath the device and/or another underside activity). In this regard, when the bunk is in a raised position, there is no conventional support bracket remaining that may interfere with the occupant below the bunk. For example, in cases where the bunk is an upper bunk located over a lower bunk, the conventional interference by the upper bunk's support bracket in the area over the lower bunk can be eliminated.
- A dampening feature to provide a controlled or dampened lowering and/or raising of the bunk.
- An assist feature to provide an assisted lowering and/or raising of the bunk so as to reduce operator effort.
- A support system that does not obstruct views via windows, such as, e.g., that does not have anything in a lower window that may block viewing therethrough.
- A support system that further inhibits vibration and/or bouncing of components during movement of the vehicle, such as, e.g., inhibiting bouncing when wheels of the vehicle encounter obstacles, such as, e.g., potholes in a roadway.
- A support system that readily holds a bunk in an up position to facilitate hands-free connection of a safety strap and/or other retainer mechanism.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
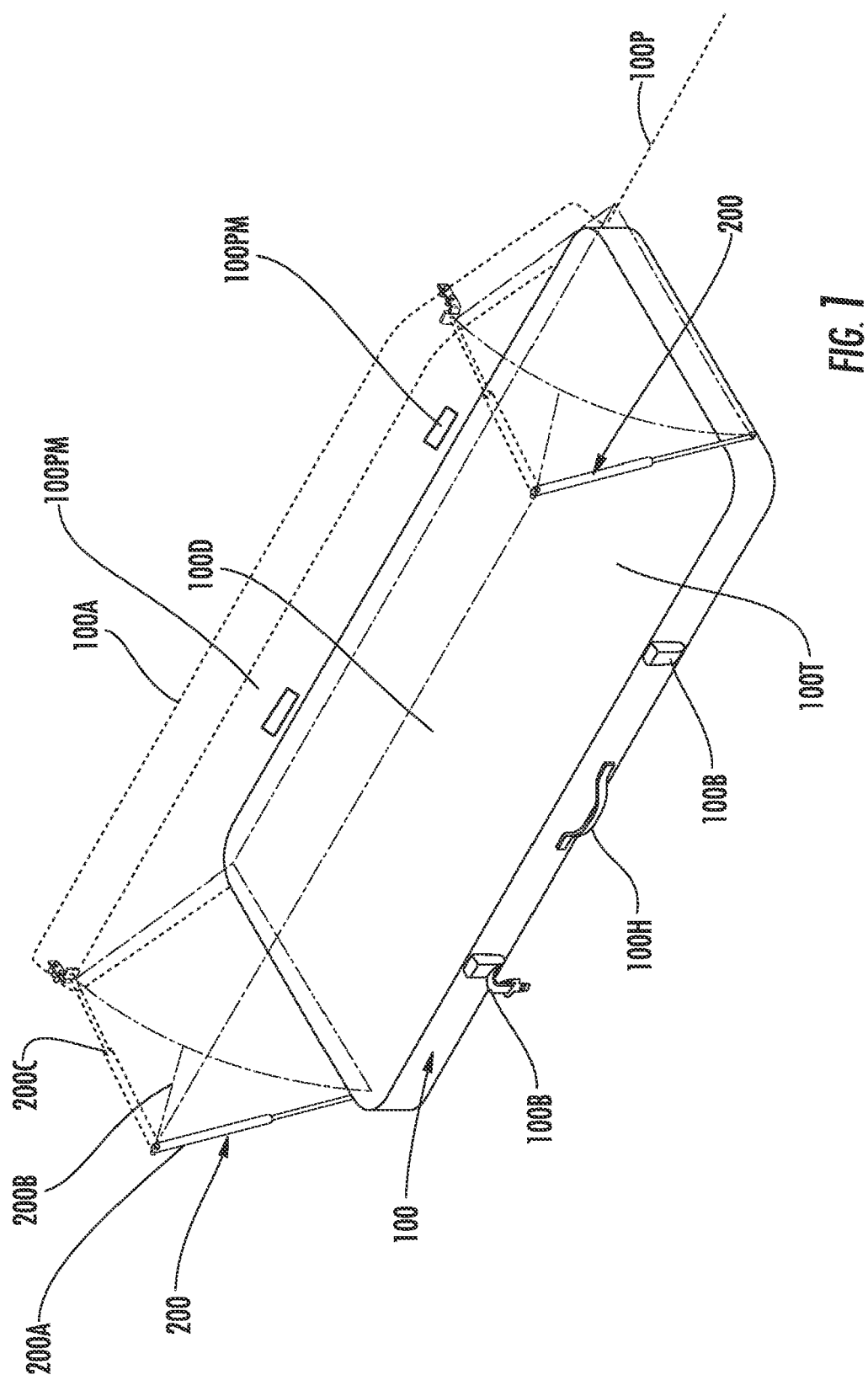
FIG. 1 is a right-front perspective view showing an illustrative spring supported sleeper bunk in both a lowered or deployed position and in a substantially raised position.
Figure 2:
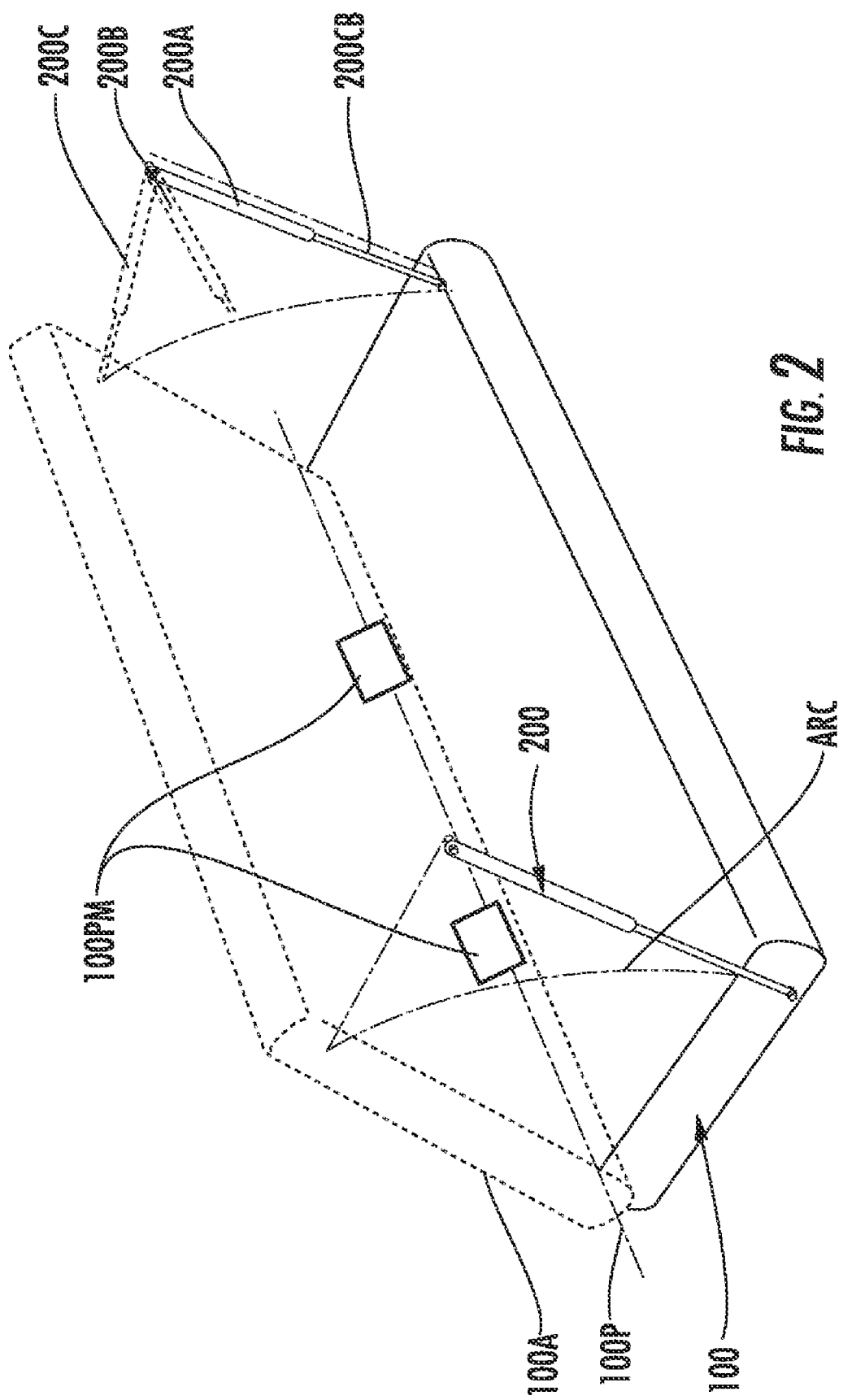
FIG. 2 a left-front perspective view showing a sleeper bunk similar to that shown in FIG. 1 in both a deployed position and a substantially raised position.

With reference to the figures, FIG. 1 is a right-front perspective view showing an illustrative spring supported sleeper bunk 100 in both a lowered or deployed position 100D and in a substantially raised or stored position 100A. As shown in FIGS. 1 and 2, the bunk 100 is preferably mounted so as to pivot around a pivot line 100P at or proximate a rear side of the bunk 100 so as to be readily pivoted between the raised position 100A and the deployed position 100D.

As also shown, the bunk 100 preferably includes a generally rectangular planar top surface 100T. Preferably, the top surface 100T provides a cushioned, resilient, pliant and/or otherwise comfortable surface for an individual to repose or sleep thereon. In that regard, the length of the bunk is preferably more than six feet long, preferably longer, and is preferably a few feet wide, so as to accommodate most individuals. In some embodiments, the bunk 100 is made with a substantially rectangular frame (such as, e.g., a metal frame) which has a semi-flexible fabric material stretched therearound (such as, e.g., a canvas material and/or other suitable material) so as to provide a cot-type of bunk. In other embodiments, the bunk 100 can include a mattress, having common mattress materials, such as, e.g., cushioning and/or other materials, along with a suitable frame to provide sufficient support and rigidity. Any appropriate bunk construction can be employed depending on circumstances as would be appreciated by those in the art based on this disclosure.

Figure 3:
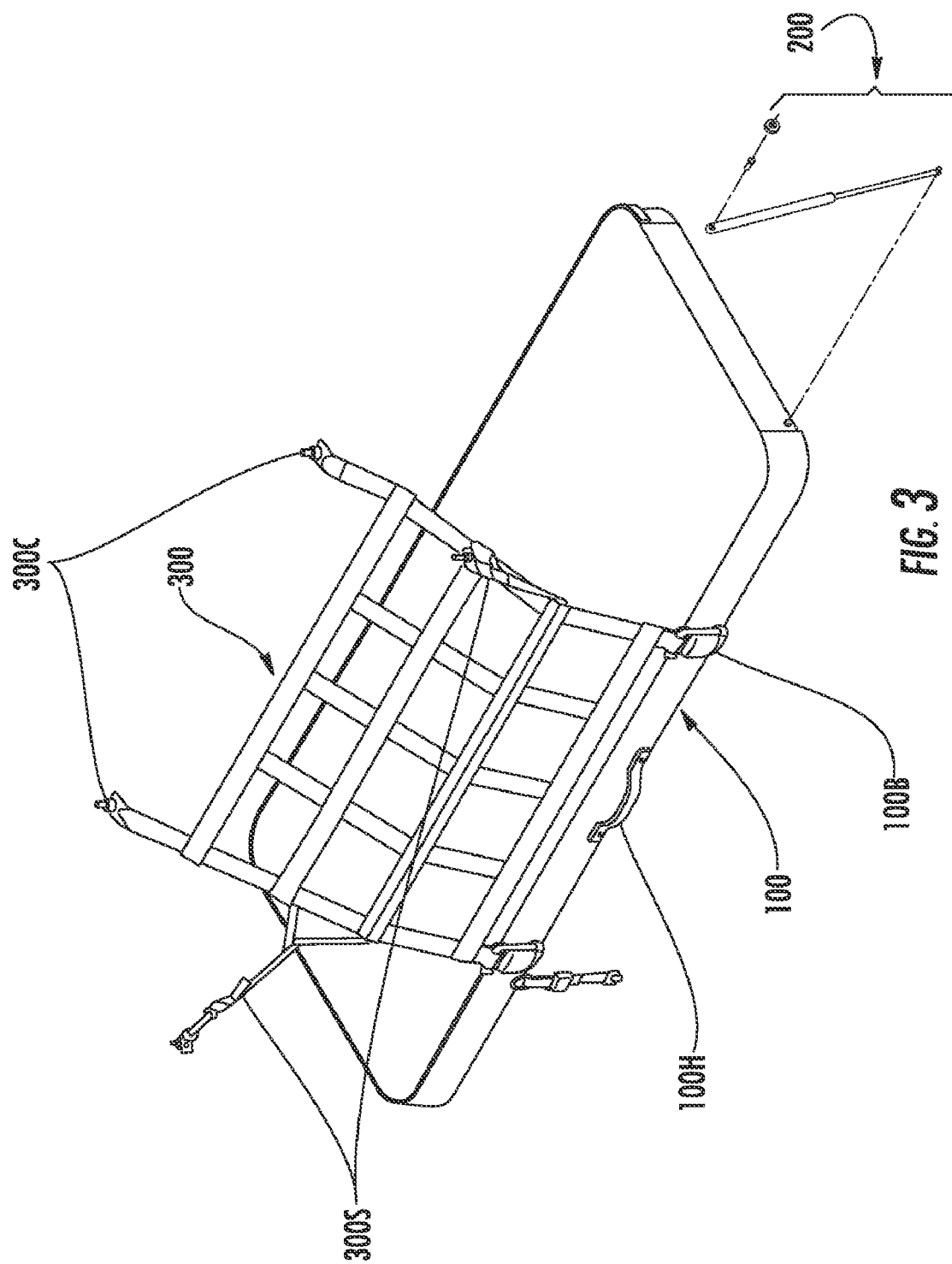
FIG. 3 is a right-front perspective view showing an illustrative spring supported sleeper bunk similar to that shown in FIG. 1 in a lowered position.

As shown in FIG. 1, in order to facilitate manual positioning of the bunk 100 between raised (or stored) and lowered (or deployed) positions, one or more handle(s) 100H can be provided. The handle(s) 100H can include a hand grip, a recess, an extension, a fabric member, at least one strap(s) and/or the like. As shown in FIGS. 1 and 3, the bunk 100 preferably also includes at least one buckle 100B for attaching a belt or retaining mechanism 300. As shown in FIG. 3, a retaining mechanism 300 can include a netting and/or a plurality of cross-straps or belts configured so as to provide a restraining shield along a side of the bunk, such as, e.g., to help maintain a person or object on the bunk 100. In some embodiments, the retaining mechanism 300 can be fixed to a roof of a vehicle, such as, e.g., via coupling members 300C, which can include, e.g., clips, rivets, latches, joints and/or other mechanisms. In some embodiments, the retaining mechanism 300 is also mounted via straps 300S which can, among other things, be used to help maintain the retaining mechanism 300 in an elevated, out-of-the-way, position proximate a ceiling or roof of a vehicle when the retaining mechanism is not buckled to the bunk via the buckles 100B. In some embodiments, the straps 300S can be resilient so as to be stretched to a lowered or buckled position and/or can be adjustable in length to facilitate positioning of the retaining mechanism 300. In various illustrative embodiments, the straps 300S can be attached to the wall and/or ceiling of the vehicle in a variety of ways, such as, e.g., using similar coupling members 300C as described above.

As shown in FIGS. 1 and 2, the bunk 100 is preferably mounted within a vehicle using at least one spring mechanism 200. As described herein-below, in the preferred embodiments, gas and/or hydraulic springs are employed. Preferably, two such spring mechanisms 200 are provided, and, most preferably, two such spring mechanisms, with one spring mechanism proximate a front end of the bunk 100 and with another spring mechanism proximate a rear end of the bunk 100.

Figure 5:
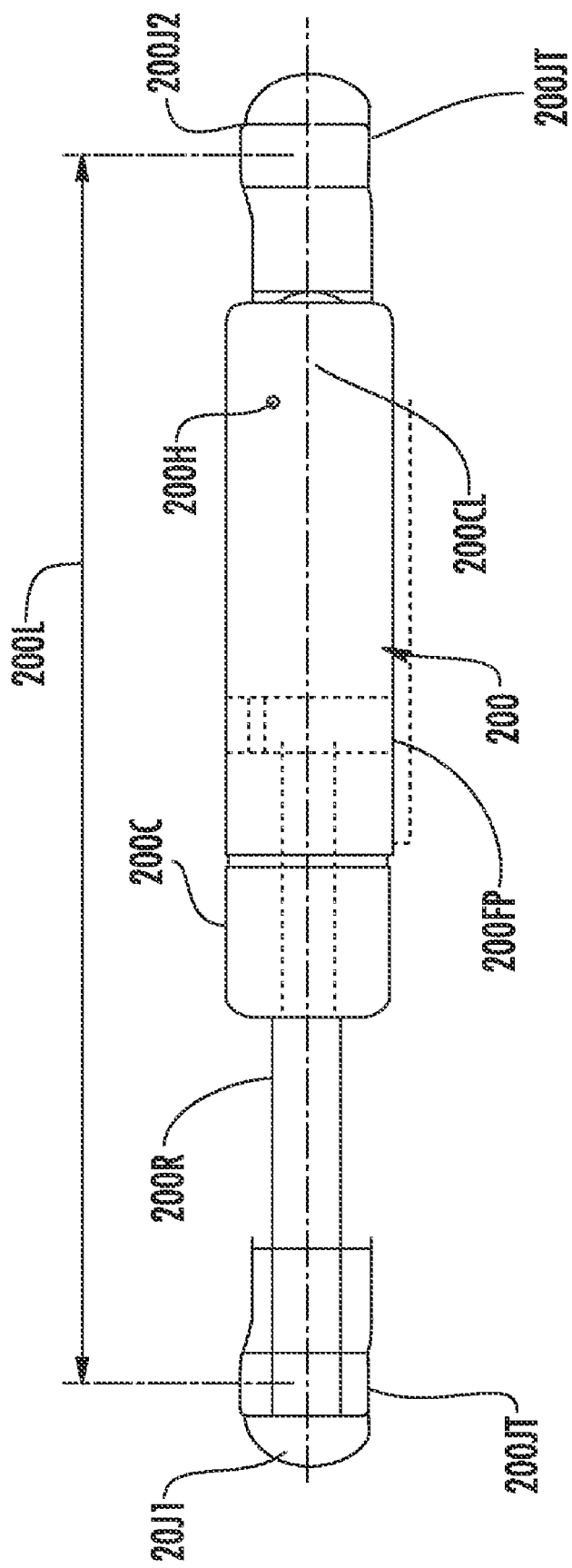
FIG. 5 is a side view of an illustrative spring that can be employed in illustrative embodiments of the present invention.

For reference, an illustrative and non-limiting spring mechanism 200 is shown in FIG. 5. As shown in FIG. 5, the spring mechanism 200 can include, e.g., two relatively movable members 200R and 200C that are spring biased so as to assume an extended state such as to bias the mechanism 200 so as to assume an increased length 200L. In some embodiments, the member 200R can include a rod or the like and the member 200C can include a cylinder or the like that telescopically receives the rod 200R. In preferred embodiments, a spring force is provided by the cylinder that causes the rod or piston to extend outward of the cylinder (e.g., leftward in FIG. 5) in a substantially linear fashion lengthwise along a centerline 200CL of the spring mechanism.

As discussed above, in the most preferred embodiments, the spring is a gas spring and/or a hydraulic spring such that compression forces on a gas and/or on a liquid impart such spring or extension forces. Illustrative and non-limiting gas springs include those manufactured by STABILUS, including, e.g., STABILUS LIFT-O-MAT gas springs (see: http://www.stabilus.com).

Figure 6:
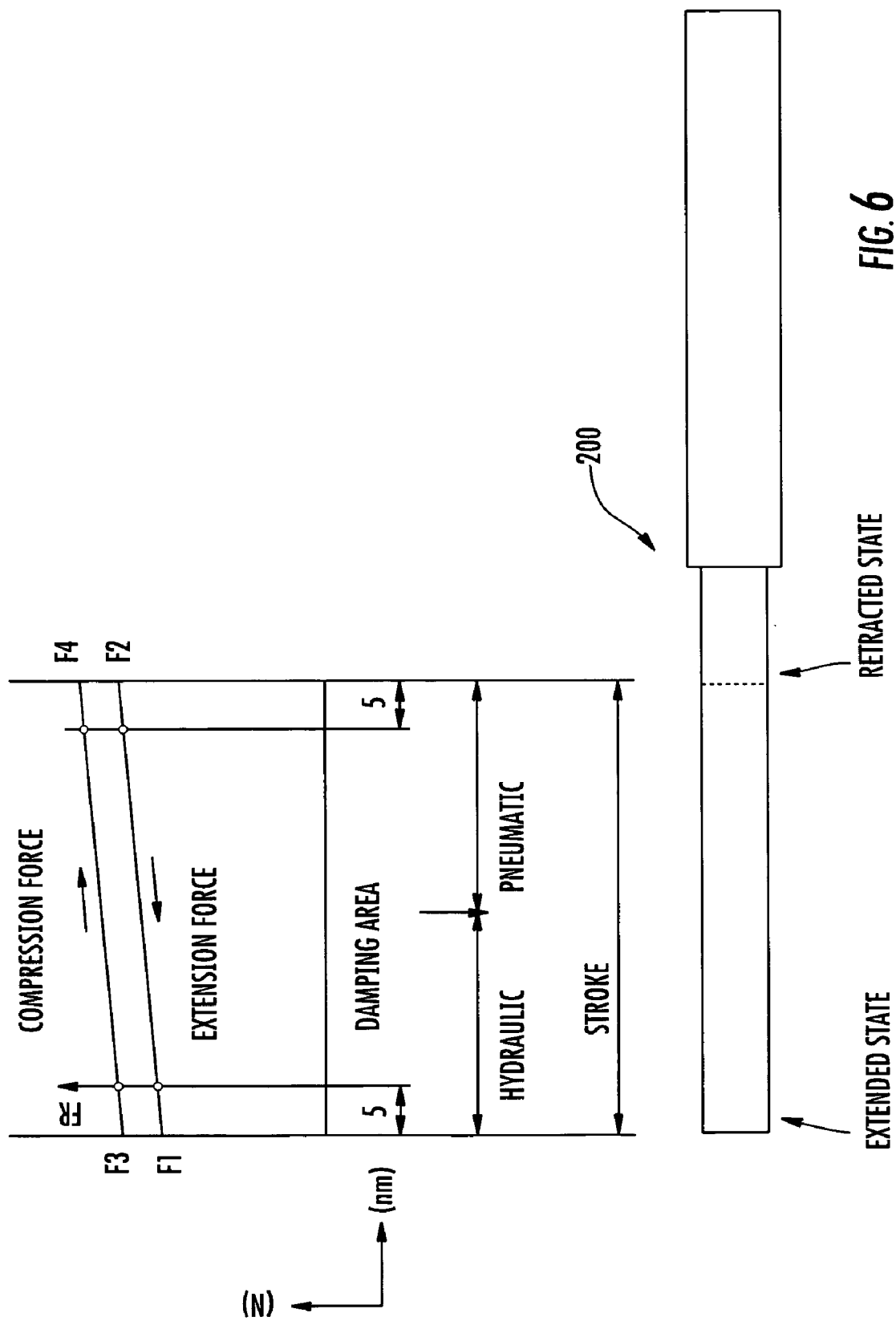
FIG. 6 is a graph showing illustrative spring forces over the stroke of the spring in accordance with some illustrative embodiments.

For reference, FIG. 6 shows an illustrative force-stroke diagram depicting an illustrative spring characteristic. In the example shown FIG. 6, the force during extension and the force during compression are different due to a dynamic friction force FR. In this regard, from the extended state, when a compression force is applied that is larger than the force F3 of an extended gas spring, the rod 200R is retracted so as to return into the cylinder 200C. On the other hand, from the retracted state, when an extension force is applied that is larger than the force F2, the rod 200R is extended. With reference to FIG. 6, a force ratio of F2/F1 defines a spring characteristic of the gas spring, which can be, e.g., about 1.1 to 1.5 in some illustrative examples. In some other illustrative and non-limiting examples, the extension speed of the gas spring can be about 0.1 to 0.3 meters per second. In the more preferred embodiments, the spring mechanism can be configured so as to apply an extension force F1 of between about 40 to 60 Newtons, or, more preferably, about 50 Newtons. Among other things, higher extension forces may present operation difficulties for some people. Nevertheless, in some other illustrative embodiments, the spring mechanism can be configured so as to apply higher extension forces F1, such as, e.g., even up to between about 200 to 320 Newtons, or in some embodiments, about 240 to 280 Newtons. In some illustrative embodiments, the spring mechanism can be configured so as to apply a compression force F4 of between about 400 to 600 Newtons, or in some embodiments, about 480 to 520 Newtons. In addition, in order to support loads on the bunk during use, the spring mechanism is preferably configured so as to be able to support a load of at least about 300 lbs during normal use, or even more than at least about 400 lbs during normal use, or even more than about 500 lbs during normal use. In some preferred embodiments, the materials of the components 200R and 200C will sustain such loads themselves and, thus, need to be adapted such that the spring mechanism readily supports such loads in-and-of-itself. Alternatively, as shown in FIG. 2, one or more supports, such as, e.g., one or more support cables 200CB can be provided to fully or partly support the loads on the bunk during normal use in the deployed state.

Figure 4:
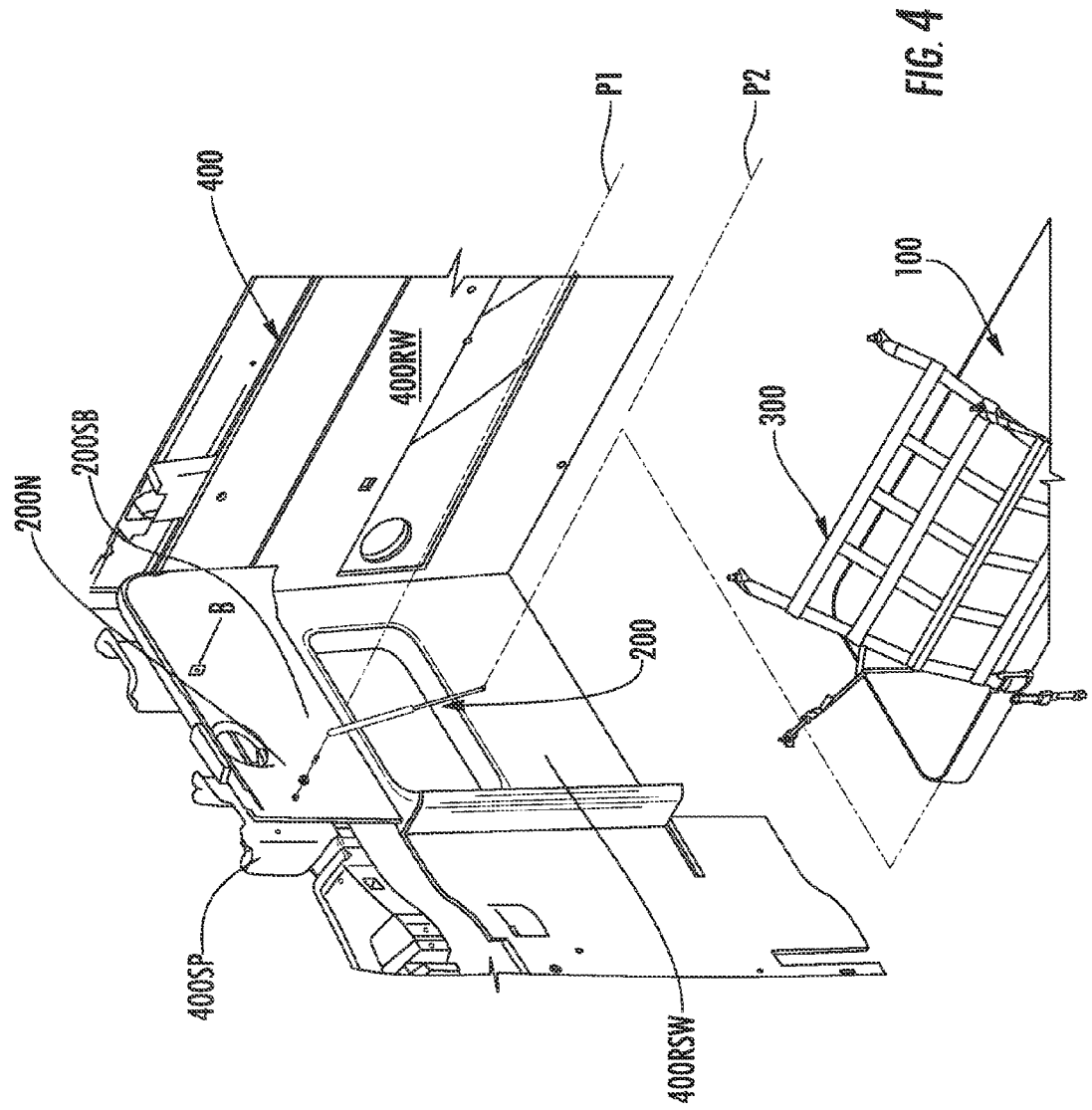
FIG. 4 is an exploded perspective view of a portion of a sleeper bunk similar to that shown in FIG. 1 as mounted within an illustrative vehicle.

Referring now to FIG. 4, in the preferred embodiments, the bunk 100 is mounted within a vehicle 400. In this regard, FIG. 4 shows a portion of an illustrative cab area within a truck by way of example. In this figure, a rear wall of the cab area is shown at 400RW and an illustrative right sidewall of the cab area is shown at 400RSW. As shown, an upper end of the spring mechanism 200 can be connected to the vehicle 400 (such as, e.g., via bolts 200SB and nuts 200N described below) while a lower end of the spring mechanism can be connected to the bunk 100 in a similar manner. In this regard, the bunk 100 preferably includes a metal frame member into which the lower end of the spring mechanism 200 can be fixedly connected. In addition, the vehicle 400 preferably includes a support member 400SP upon which an upper end of the spring mechanism 200 can be supported. By way of example, the support member 400SP can include a plate that is fixedly attached to the body of the vehicle, such as, e.g., to a side wall, to a headliner and/or to a ceiling of the vehicle. Additionally, the support member 400SP can also or alternatively comprise the side wall, the headliner and/or the ceiling of the vehicle itself.

With reference to FIG. 4, as discussed above, the upper end of the spring mechanism 200 is preferably pivotally mounted so as to pivot at least around the axis P1, while the lower end of the spring mechanism includes a pivot mount to allow the lower end of the spring to pivot relative to the bunk frame at axis P2. In various embodiments, the configuration of the spring mechanism can be selected as desired so as to facilitate the pivotal motion. For example, with reference to FIG. 5, in some embodiments, the spring mechanism 200 can include joint members 2 200J1 and 200J2 which can be configured to allow for pivotal motion at these joints. In some preferred embodiments, the joint members 200J1 and 200J2 can involve universal joints to allow for universal pivotal motion around a plurality of axes. In some embodiments, as shown in FIG. 5, the joint members 200J1 and 200J2 can include through-holes 200JT for receiving support members (such as, e.g., rods, pins, screws, bolts and/or the like), such as, e.g., support bolts 200SB and nuts 200N as shown in FIG. 4.

As discussed above, the rear end of the bunk 100 is preferably pivotally mounted so as to pivot around the axis 100P as shown in FIGS. 1 and 2 with respect to the rear wall 400RW of the vehicle, such as, e.g., via one or more pivot mechanisms 100PM, such as, e.g., hinges, etc.

Figure 7:
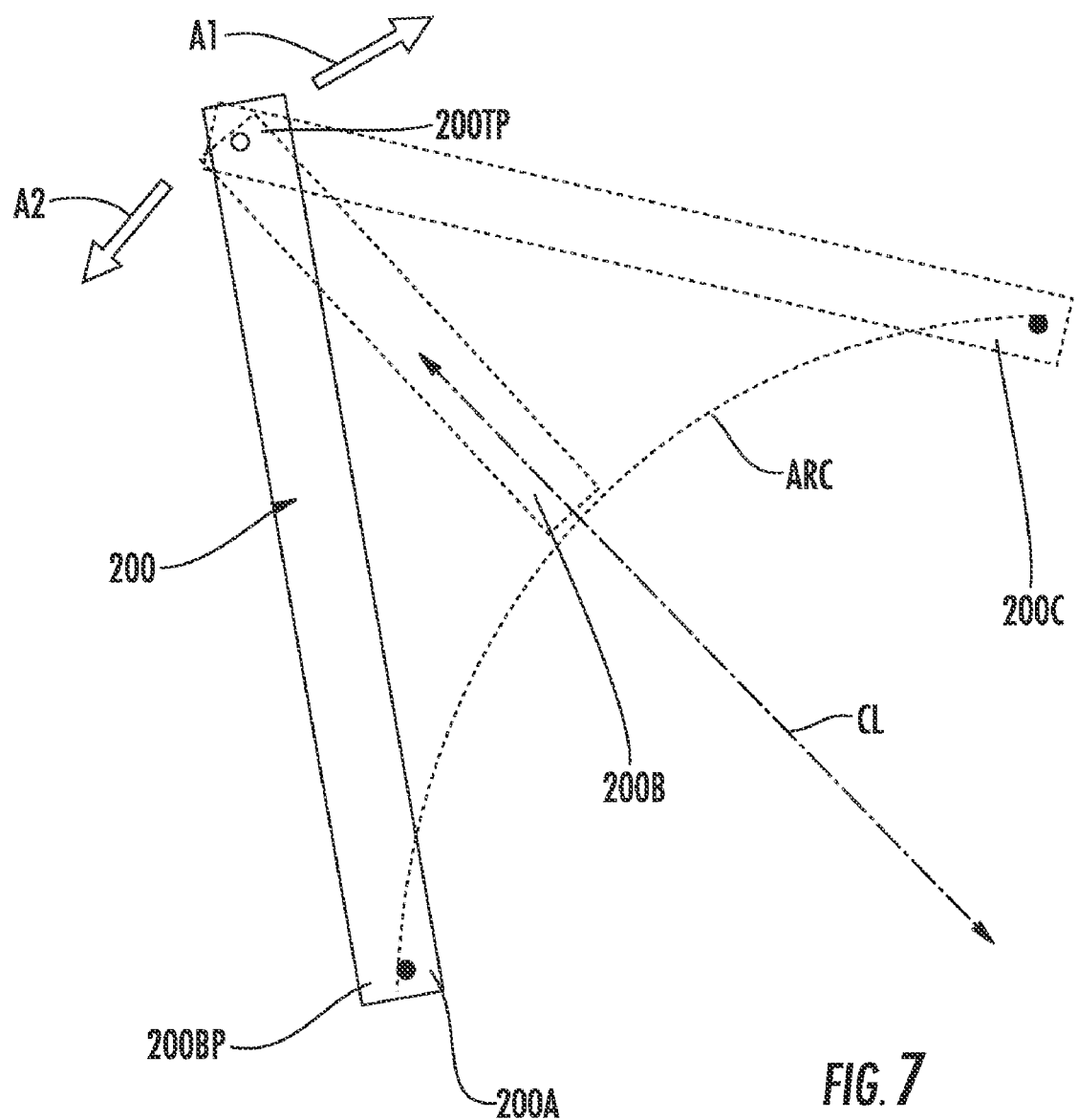
FIG. 7 is a schematic diagram illustrating positional states of a spring mechanism in accordance with some illustrative and non-limiting embodiments.

In operation, the bunk can be advantageously moved between a stored (e.g., raised) position, such as, e.g., position 100A and a deployed (e.g., lowered) position 100D shown in FIGS. 1 and 2. FIG. 7 is a schematic diagram that helps to illustrate the relative positions of the spring mechanism and the bunk during movement between the deployed and stored positions, both with the spring mechanism in the extended state, and the intermediate position in which the spring mechanism is contracted. To cause this motion, a user preferably manually grasps the handle(s) 100H and/or otherwise physically moves the bunk into one of the noted positions. During this movement, the top end 200TP of the spring mechanism (fixed to the vehicle 400) preferably remains at a fixed or substantially fixed position relative to the vehicle 400 while the bottom end 200BP of the spring mechanism (fixed to the bunk) preferably follows an arcuate path ARC along with the motion of the bunk 100 between the deployed and stored positions 200D and 200A, respectively.

In this illustrative example, the spring mechanism is mounted at its upper end such that the top pivot point 200TP (centered on axis P1) is located substantially along a center line CL between the locations of the bottom pivot point 200BP (centered on axis P2) between the deployed and the stored states 200A and 200C. In some alternative embodiments, the location of the pivot point 200TP can be moved upwards, downwards, leftwards and/or rightwards, such as, e.g., in the directions of the arrows A1 and/or A2 shown in FIG. 7. By way of example, in some embodiments, the spring member can be in a fully extended state when situated in the state 200C, such that in the stored position the spring member retains the bunk in position but does not exert a significant force against the bunk. On the other hand, in some embodiments, the spring member can be in less than a fully extended state when situated in the state 200C, such that in the stored position the spring mechanism applies a retaining force against the bunk. Among other things, by applying such a force, the bunk may, e.g., be secured in a stored position (such as, e.g., against the wall) such that vibration, etc., thereof during operation of the vehicle can be inhibited.

Referring again to FIGS. 1 and 2, in the deployed position 100D, the spring mechanism 200 is preferably situated with the spring mechanism in a fully extended state (e.g., with the rod 200R extended from the cylinder 200C). While moving the bunk 100 towards the deployed position, the spring mechanism 200 is preferably arranged so as to apply a downward spring force so as to facilitate movement of the bunk downward into the deployed state, from, for example, between about a center position of the spring mechanism 200B to the position 200A. On the other hand, while moving the bunk 100 upwards towards the raised position, the spring mechanism 200 is preferably arranged so as to apply a rearward spring force so as to facilitate movement of the bunk rearward, from, for example, between about the center position of the spring mechanism 200B to about the position 200C.

Similarly, while in some preferred embodiments, the spring mechanism is in a fully extended state when in the stored or deployed positions, the spring mechanism preferably still has a substantial spring force in the fully extended state (e.g., in contrast to metal springs, a gas and/or hydraulic spring does not have a substantially diminished spring force at a small compression stroke). Accordingly, in the stored position, the spring mechanism also advantageously helps to inhibit vibration, etc., during operation of the vehicle. Alternatively, in the deployed position the spring mechanism can also be only partly extended if desired, such as, e.g., by using stops upon which the bunk rests or abuts in a stored state and/or by using one or more support cable(s) (see, e.g., cable 200CB shown in FIG. 2) or the like that support the bunk prior to the spring mechanism reaching a fully extended state. Among other things, such support cable(s) or the like can help to enable the spring mechanism to be downsized or otherwise constructed in a manner to avoid requiring the spring mechanism to support the entire load upon the bunk 100 during deployment.

Among other things, the use of a gas and/or hydraulic spring has a variety of benefits and advantages over other types of springs. One benefit over common metal springs includes that the gas and/or hydraulic springs can include an advantageous damping feature to help limit speed of deployment of the bunk. Accordingly, for example, the movement into the deployed state 200A can even be somewhat slower than that which would result due to gravitational forces, or even just less than that which would occur due to gravitational forces plus added forces of the spring mechanism in the absence of such damping. By way of example, some illustrative gas springs can be configured to have a specific extension speed, such as, e.g., within a range of about 0.05 to 0.5 meters per second, or more specifically within a range of about 0.1 to 0.3 meters per second.

With reference to FIG. 5, in some preferred embodiments a gas spring involves a hydro/pneumatic adjusting element. In some instances, the cylinder 200C can include a pressure tube that is filled with a compressed gas, such as, e.g., compressed nitrogen. As shown in dashed lines in FIG. 5, the rod 200R can extend within the pressure tube to a piston head. As also shown in dashed lines, the piston head can include a through-hole or bore 200H to allow gas to pass there-through or there-around. As a result, the larger surface area of the piston head opposite to said rod 200R produces an extension force.

As shown in FIG. 5, in some embodiments, damping can be adjusted so as to provide further damping proximate one or both end positions of the stroke, such as, e.g., at regions 5 at the ends of the stroke shown in FIG. 5. In some embodiments, this enhanced end-of-stroke damping can be performed in a plurality of ways. First, increased hydraulic damping can be employed within which a portion of the cylinder 200C is filled with a hydraulic fluid, such as, e.g., an oil. In this manner, due to the increased viscosity of the hydraulic fluid over the gas in the cylinder 200C, when the piston head reaches the hydraulic fluid such that the fluid must flow through the bore in the piston head, the flow resistance is increased and the motion is further damped. Thus, in situations wherein the spring mechanism 200 is mounted generally upright such as, e.g., shown in FIG. 7 at position 200A, then such a method can be used to provide further dampening near an extended state of the rod 200R (e.g., by situating the rod 200R below the cylinder 200C as shown in FIGS. 1 and 2 so that the piston head is within a fluid nearer to the extension state of the rod due to gravitational effects situating the fluid nearest to a bottom side of the cylinder 200C).

In other embodiments, the speed of a gas and/or hydraulic spring can be alternatively or also dynamically controlled by varying the size of a passageway through or around the piston head during different portions of the stroke of the rod 200R. By way of example, with reference to FIG. 6, to provide increased dampening in regions 5 near fully extended and/or fully retracted states, a restricted flow can be provided within such regions. To provide such a restricted flow, by way of example, as shown in FIG. 5, a flow increasing path 200FP can be provided (which, e.g., can extend around the side of the piston head along a center region between regions 5 so that flow is increased within a middle region and decreased within the regions 5 where such an additional flow is not provided).

In some embodiments, other types of spring mechanisms can be employed. By way of example, in some embodiments, a similar rod 200R and cylinder 200C can include a mechanical coil spring (not shown) positioned so as to bias the mechanism into an extended condition, which can be provided along with gas and/or hydraulic spring characteristics in some embodiments.

In some illustrative and non-limiting embodiments, one or more of the following advantages and/or features can be achieved.

A gas and/or hydraulic spring mechanism that provides support (i.e., biasing support) in both deployed (e.g., down) and stored (e.g., up) states or positions.

A support system that does not require a conventional support bracket that may interfere with an occupant's use of the area below the bunk (e.g., for a lower bunk, a table underneath the device and/or another underside activity).

A dampening feature to provide a controlled or dampened lowering and/or raising of the bunk.

An assist feature to provide an assisted lowering and/or raising of the bunk so as to reduce operator effort.

A support system that does not obstruct views via windows, such as, e.g., that does not have anything in a lower window that may block viewing there-through.

A support system that further inhibits vibration and/or bouncing of components during movement of the vehicle, such as, e.g., inhibiting bouncing when wheels of the vehicle encounter obstacles, such as, e.g., potholes in a roadway.

A support system that readily holds a bunk in an up position to facilitate hands-free connection of a safety strap and/or other retainer mechanism.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A system for supporting individuals or objects within a vehicle, comprising:
   a) a support platform having an upper surface;
   b) a pivot mechanism connected to said support platform so as to pivot said support platform around a pivot axis to move between a stored position and a deployed position;
   c) at least one flowable-medium spring having a first end fixed relative to said vehicle and a second end fixed relative to said support platform at a location displaced from said pivot axis;
   d) said at least one flowable-medium spring being arranged so as to impart an extension force that biases said support platform toward said deployed position and so as to impart an extension force that biases said support platform toward said stored position while allowing movement of said support platform between said stored position and said deployed position.

2. The system of claim 1, wherein said flowable medium includes a gas.

3. The system of claim 1, wherein said flowable medium includes a liquid.

4. The system of claim 2, wherein said flowable medium includes a liquid.

5. The system of claim 1, wherein each said at least one flowable-medium spring is configured so as to provide varied damping along a stroke of said spring.

6. The system of claim 5, wherein each said flowable-medium spring is configured so as to provide increased damping proximate at least one end of said stroke of said spring relative to at at least one other damping position of said stroke.

7. The system of claim 1, wherein said at least one flowable-medium spring supports said support platform in said deployed position.

8. The system of claim 1, further including at least one additional support that supports said support platform in said deployed position in a manner such that said at least one flowable-medium spring does not bear a load imparted on said support platform.

9. The system of claim 8, wherein said additional support includes at least one cable.

10. The system of claim 1, wherein said flowable-medium spring includes an extension rod, a compression cylinder into which said extension rod extends, and a piston head attached to said extension rod within said cylinder.

11. The system of claim 1, wherein said system support platform is a sleeper bunk.

12. The system of claim 11, wherein said vehicle is a truck and the sleeper bunk is supported within a cab of the truck.

13. The system of claim 1, wherein during movement of said support platform between said deployed and stored positions, a front side of said support platform opposite to said pivot axis follows a substantially arcuate path, and wherein said first end of said at least one flowable-medium spring is located at an opposite side of said arcuate path than said pivot axis.

14. The system of claim 13, wherein said first end of said at least one flowable-medium spring is fixed at or near a centerline of said support platform between said deployed and stored positions.

15. A method for supporting individuals or objects within a vehicle, comprising:
   a) providing a support platform having an upper surface to support at least one individual or object;
   b) providing a pivot mechanism connected to said support platform so as to pivot said support platform around a pivot axis to move between a stored position and a deployed position;
   c) providing at least one flowable-medium spring having a first end fixed relative to said vehicle and a second end fixed relative to said support platform at a location displaced from said pivot axis;
   d) arranging each of said at least one flowable-medium spring so as to impart an extension force that biases said support platform into said deployed position and so as to impart an extension force that biases said support platform into said stored position during at least portions of the movement of said support platform between said stored position and said deployed position.

16. The method of claim 15, further including providing a varied damping along a stroke of said spring.

17. The method of claim 16, further including providing increased damping proximate at least one end of said stroke of said spring relative to at least one other damping position of said stroke.

18. The method of claim 15, further including using said at least one flowable-medium spring to support said support platform in said deployed position.

19. The method of claim 15, further including supporting one or more of said individuals in a reposed state on said support platform.

20. The method of claim 15, wherein said support platform is a sleeper bunk and said vehicle is a truck and further including the step of locating said sleeper bunk within a cab of said truck.

* * * * *